United States Patent Office 2,925,805
Patented Feb. 23, 1960

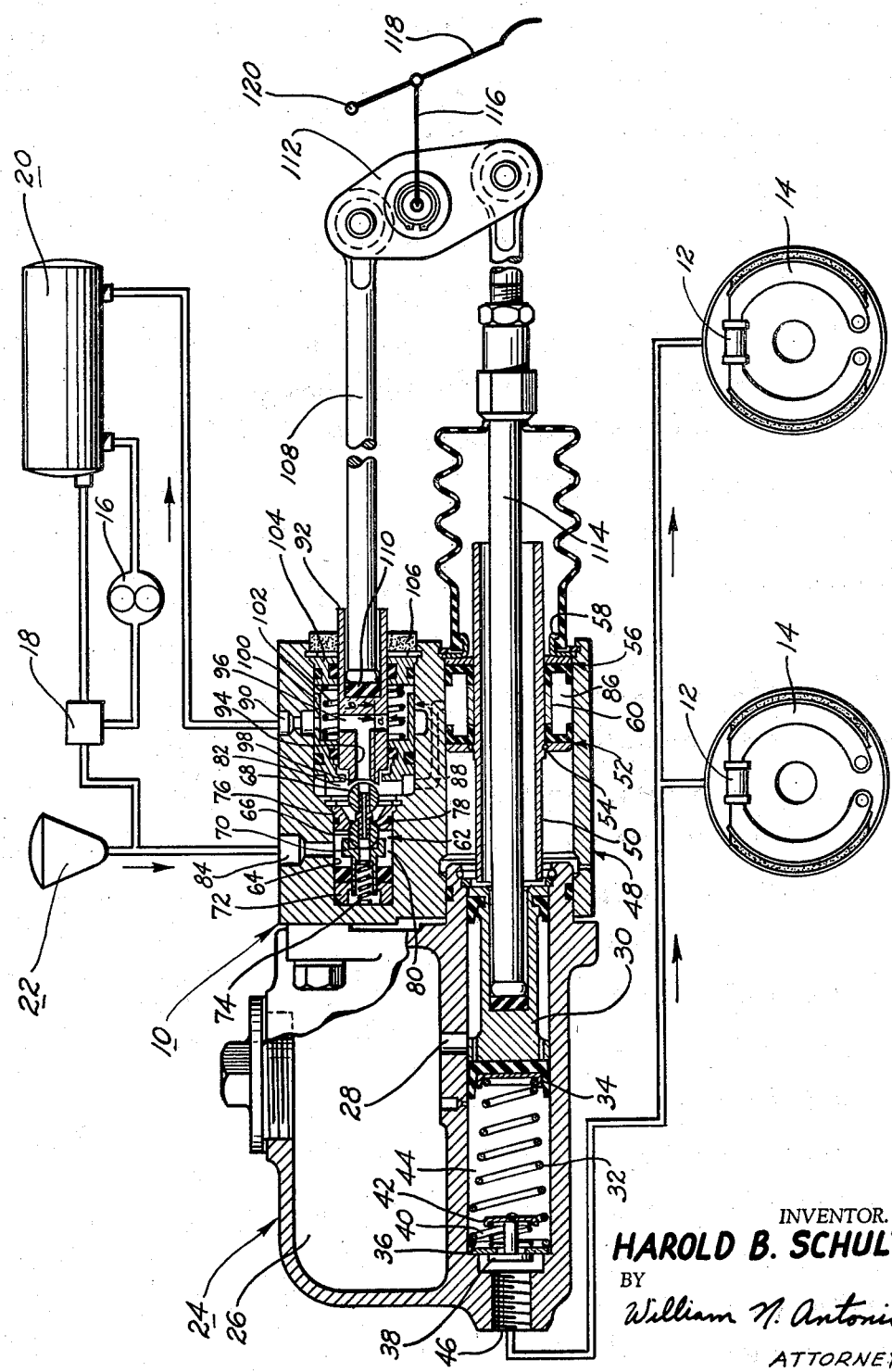

2,925,805

HYDRAULIC BRAKE BOOSTER

Harold B. Schultz, South Bend, Ind., assignor to Bendix Aviation Corporation, South Bend, Ind., a corporation of Delaware Application June 7, 1957, Serial No. 664,384

5 Claims. (Cl. 121—41)

This invention relates to a power-assisted actuator and more particularly to a hydraulic pressure producing device which is conjointly operated by manually actuated means and power actuated means.

An object of this invention is to provide a pressure booster, utilizing fluid from a hydraulic pressure source, to exert a brake applying force according to the amount of advancement of a manually operated control member, wherein a hydraulic reaction is exerted on the control member so that the operator can sense or "feel" the magnitude of applied brake pressure.

Another object of this invention is to provide a self contained pressure booster device which may be assembled with a standard master cylinder, wherein little or no modification of the master cylinder is required.

A further object of this invention is to provide an improved power-actuated braking system employing a pressure booster unit in operating relation with a master cylinder in such a manner that the fluid from the fluid pressure source is completely isolated from the brake fluid of the hydraulic braking system.

A still further object of this invention is to incorporate with a power assisted master cylinder for use in a vehicle braking system, a two stage hydraulic reaction mechanism for apprising the operator of the magnitude of applied brake pressure.

An additional object of this invention is to incorporate with a power assisted master cylinder for use in a vehicle braking system, a two stage hydraulic reaction device including a primary reaction transmitting member subject to pressure developed in the power cylinder for transmitting reaction during the initial application of brakes, and a secondary reaction transmitting member subject to the pressure in the power cylinder for transmitting reaction after the initial brake application has been made, said secondary reaction member being inoperative to transmit reaction until a predetermined pressure has been reached after the initial brake application because of resilient counterreaction means.

Another object of this invention is to provide a mechanical linkage between the brake pedal and the master cylinder piston which in the event of power failure will obviate the necessity of having the operator drag along the power piston and/or valve control means as is often the case in prior art devices, thereby reducing the manual force required in such instances and providing a quicker and more efficient response.

A further object of this invention is to provide a hydraulic brake booster which is small, compact, and inexpensive to fabricate.

The above objects and features of my invention will become apparent from the following description taken in connection with the accompanying drawing which forms a part of this invention.

Referring to the drawing, the numeral 10 indicates a hydraulic brake booster incorporated in a hydraulic system which includes motors 12 of brakes 14, a pump 16, a pressure regulating valve 18, a reservoir 20, an accumulator 22, and the requisite pipe lines.

The brake booster includes a conventional master cylinder assembly 24 comprising a brake fluid reservoir 26 having an opening 28 which communicates with a master cylinder piston 30 in the usual manner. The piston 30 is conventionally disposed in a suitable elongated cylindrical opening in the assembly and is biased toward the position shown in the drawing by means of a spring 32. The right end of the spring, as viewed in the drawing, abuts a cup-shaped retainer 34 against which the end of piston 30 is disposed while the other end of the spring abuts a washer 36. This washer and the valve member 38 form a two-way valve mechanism, the valve member 38 being biased by a spring 40 located between washer 36 and a cap 42 to the position illustrated in the drawing. The retainer 34, the washer 36, and the surrounding circular walls define a variable volume chamber 44. It will be obvious to those skilled in the art that movement of the master cylinder piston 30 to the left will effect the opening of the valve 38 so that fluid from chamber 44 will pass in the direction of the arrow through brake port 46 to the motors 12 of the brakes 14. When the force on the master cylinder piston 30 is removed, the spring 32 will cause the piston to return to the position illustrated and the brake fluid will return through brake port 46 and around the outward surfaces of washer 36 to the chamber 44.

A power cylinder 48, adjacent the master cylinder piston 30, includes a piston tube 50, a seal and washer power piston assembly 52 abutting a retaining ring 54, and a seal and washer closure assembly 56 which is held in position by a retainer 58 and seal spacer 60.

The control valve 62 which lies in bore 64 and controls movement of power piston 52 includes two ball valves 66 and 68 connected by a hollow stem to form a dumbbell shaped valve member, a hollow ball guide 70 reciprocable in guide bushing 72 and biased by a spring 74 to the position shown in the drawing wherein it always abuts ball valve 66, and a bushing 76 located between ball valves 66 and 68 having valve seat 78 formed thereon. The bushing 76 divides the bore 64 into chambers 80 and 82, the first of which communicates with the inlet port 84 and the second of which communicates with chamber 86 of power cylinder 48 via passage 88 and with return port 90.

A plunger 92 is located in the other end of bore 64, opposite the ball guide 70, for axial movement therein, in order to control the flow of fluid between the ports. The plunger is formed with a longitudinal passage 94 and radial passages 96, only one of which is shown. These passages communicate chamber 82 with the return port 90. A valve seat 98 is formed on plunger 92 at the end of passage 94 for engagement with the ball valve 68, said valve seat and ball valve in combination controlling flow between the power chamber 86 and return port 90. Ball valve 66 and valve seat 78 in combination control flow between the inlet port 84 and power chamber 86.

In order to hydraulically balance the valve, the effective seating areas formed by the balls 66 and 68 on valve seats 78 and 98 are equal. Each of these areas is in turn equal to the cross-sectional area of the end of the valve guide 70 which is slidable within guide bushing 72.

The actuating means for the valve comprises the plunger 92, and counterreaction piston 100 which is urged towards ball valve 68 by a spring 102. The plunger 92 and the counterreaction piston 100 provide a two stage hydraulic reaction mechanism which will subsequently be explained in greater detail. The end of bore 64 is closed by a bushing 104 and a felt wiper 106, The manually operated actuating mechanism comprises, generally, a valve rod 108 which abuts a bumper 110 within plunger 92 and which, as will be hereinafter described, requires that it be pushed inwardly in order to bring about delivery of pressurized fluid to power chamber 86. Since it is desired that the system shall have a hunting or follow-up action, the valve rod 108 is connected by a link 112 with a push rod 114 which abuts master cylinder piston 30 and is free to move within piston tube 50 without dragging along the power piston 52. The link 112 is connected intermediate its ends to a rod 116 and this rod in turn is connected to a pedal lever 118 which pivots about point 120. Thus as the pedal lever 118 is depressed the push rod 114 initially acts as a fulcrum for link 112, so that the upper end of said link pushes the valve rod 108 inwardly, i.e. to the left. This results in movement of the master cylinder piston 30 and push rod 114 to the left, and if the pedal lever 118 is held steady the link 112 pivots upon the end of the rod 116, thus tending to relieve the force against plunger 92 so that ball valve 66 will be caused to seat on valve seat 78 by the force of spring 74, thereby cutting off the supply of pressurized fluid to the power chamber 86.

Operation of the brake booster will be as follows:

When the operator pushes pedal 118, valve rod 108 and plunger 92 are caused to move to the left until valve seat 98 of plunger 92 contacts ball valve 68. Continued movement of the plunger to the left against spring 74 will cause ball valve 66 to be unseated from valve seat 78, thereby permitting pressurized fluid to flow from the inlet port 84 to power chamber 86 via chamber 80, chamber 82, and passage 88. The pressure buildup in chamber 86 will cause power piston assembly 52 and piston tube 50 to move to the left, said movement also causing movement of the master cylinder piston 30 after the piston tube 50 makes contact therewith. Movement of the master cylinder piston displaces fluid from chamber 44 to motors 12 of brakes 14 as previously described.

In order to create a desirable "feel" during braking, the pressurized fluid conveyed to power chamber 86 is also permitted to exert a reaction force to the right against the plunger 92 by acting on an effective area "a" defined by valve seat 98 and the outer diameter of the plunger. When the force of the fluid pressure in chamber 82 is sufficient to overcome the counterreaction spring 102, the counterreaction piston 100 will also move to the right until it contacts plunger 92, thereby creating an increase in the reaction force transmitted to the operator, since the pressurized fluid will act on a larger effective area "b" defined by valve seat 98 and the outer diameter of counterreaction piston 100. By using such a two-stage reaction mechanism, it is possible to provide an excellent brake "feel" since the operator will have a light initial "feel" transmitted via the primary reaction member (plunger 92) until the brake shoes frictionally engage the drum and a heavier "feel" transmitted by the secondary reaction member (counterreaction piston 100) thereafter. This type of "feel" is comparable to a conventional non-power braking system in which the initial pedal travel takes up the usual shoe to drum clearance with the expenditure of little force, and in which a greater expenditure of force is required after the shoes have engaged the drum.

The force exerted by the operator in resisting the reaction forces of the primary and secondary reaction members acts on the master cylinder piston 30 via push rod 114 conjointly with the force of power piston 52. In effect, physical force is exerted directly on the master cylinder piston. Thus, in the event of power failure, since the push rod 114 is connected directly with the master cylinder piston, a quicker and more efficient response will be possible, because it is not necessary to drag along the power piston.

When the operator removes his foot pressure from the pedal 118, the spring 74 will force the ball valves 66 and 68 to the right so that ball valve 66 is seated on valve seat 78, thereby preventing further communication between inlet port 84 and power chamber 86. The pressure in chambers 86 and 82 will cause plunger 92 to move to the right, thereby communicating power chamber 86 with return port 90 via passage 88, chamber 82, and passages 98 and 96. When the force on the master cylinder piston 30 is removed, the brake fluid will return through brake port 46 in the manner previously described.

Although a particular embodiment of the invention has been illustrated and described, other changes and modifications will be apparent to those skilled in the art. All changes and modifications falling within the scope of the claims are intended to be claimed.

Having thus described the various features of the invention, what I claim as new and desire to secure by Letters Patent is:

1. For use in a fluid pressure system, a hydraulic pressure producing device for controlling movement of a movable element, said device comprising a housing having a bore therein, a pressure responsive member located in said bore, a tubular member connected to said pressure responsive member, said tubular member being positioned to transmit the motion of said pressure responsive member to said movable element, a manually operable push rod located within and movable relative to said tubular member, said push rod having one end thereof abutting said movable element for manually moving said element, a second bore in said housing, an inlet port and a return port communicating with said second bore, passage means communicating one side of said pressure responsive member with said second bore, a first valve seat interposed between the inlet port and said pressure responsive member, a second valve seat interposed between the pressure responsive member and said return port, a dumbbell-shaped valve member arranged to seat on said valve seats, a manually movable plunger located in said second bore for unseating the valve member from said first seat and seating it on the second seat, said plunger including a passage in which said second valve seat is located, a counterreaction piston concentric with and slidable on said plunger, said plunger and reaction piston being subject to the pressure exerted against said pressure responsive member, said pressure exerting a reaction force opposing movement of said plunger and reaction piston, means located on said reaction piston for contacting said plunger and transmitting the reaction forces exerted against said piston to said plunger after limited relative movement therebetween, resilient means abutting said reaction piston for opposing movement of said piston up to a predetermined pressure, a manually operable valve rod abutting said plunger for moving said plunger toward said valve member and for transmitting the reaction forces exerted on said plunger and reaction piston to the operator, and means for connecting said valve rod to said push rod.

2. For use in a fluid presure system, a pressure producing device for controlling movement of a movable element, said device comprising a power cylinder, a pressure responsive member located in said power cylinder, a tubular member connected to said pressure responsive member, said tubular member being positioned to transmit the motion of said pressure responsive member to said movable element, a manually operable push rod movable within said tubular member having one end abutting the movable element for manually moving said element, an inlet port and a return port communicating with said pressure responsive member, valve means for controlling flow to and from said pressure responsive member, said valve means including a fixed first valve seat located between said inlet port and said pressure responsive member, a movable second valve seat located between said return port and said pressure responsive member, and a valve member seatable on said first or second seat, means urging said valve member to seat on said first valve seat, a manually movble plunger on which said second valve seat is formed for unseating said valve member from said first valve seat, a passage formed within said plunger for communicating said pressure responsive member with said return port, a counterreaction piston concentric with and slidable on said plunger, means for preventing relative movement between said plunger and said counterreaction piston after limited movement therebetween, said plunger and counterreaction piston being subject to the pressure exerted against said pressure responsive member, said pressure exerting a reaction force opposing movement of said plunger and counterreaction piston, resilient means abutting said reaction piston for neutralizing a predetermined portion of the initial reaction force on said reaction piston, a manually operable valve rod, abutting said plunger for moving said plunger toward said valve member and for transmitting the reaction forces exerted on said plunger and counterreaction piston to the operator, and means for connecting said valve rod to said push rod.

3. For use in a fluid pressure system, a pressure producing device for controlling movement of a movable element, said device comprising a power cylinder, a pressure responsive member located in said power cylinder, a tubular member to which said pressure responsive member is connected for transmitting the motion of said pressure responsive member to said movable element, a manually operable push rod movable within said tubular member having one end abutting the movable element, an inlet port and a return port communicating with said pressure responsive member, valve means for controlling flow to and from said pressure responsive member, a manually movable plunger for actuating said valve means, a counterreaction piston concentric with and slidable on said plunger, means for preventing relative movement between said plunger and said counterreaction piston after limited movement therebetween, said plunger and counterreaction piston being subject to the pressure exerted against said pressure responsive member, resilient means opposing movement of said counterreaction piston up to a predetermined pressure, a manually operable valve rod abutting said plunger for moving said plunger and transmitting the reaction forces created by the pressure acting on said plunger and counterreaction piston to the operator, and means for connecting said valve rod to said push rod.

4. For use in a fluid pressure system, a pressure producing device for controlling movement of a movable element, said device comprising a power cylinder, a pressure responsive member located in said power cylinder, means connected to said pressure responsive member for transmitting the motion of said member to said movable element, an inlet port and a return port communicating with said pressure responsive member, valve means for controlling flow to and from said pressure responsive member, a manually movable plunger for actuating said valve means, a counterreaction piston concentric with and slidable on said plunger, means for preventing relative movement between said plunger and said counterreaction piston after limited movement therebetween, said plunger and counterreaction piston being subject to the pressure exerted against said pressure responsive member, means for opposing movement of said counterreaction piston up to a predetermined pressure, and a manually operable valve rod for moving said plunger and transmitting the reaction forces created by the pressure acting on said plunger and counterreaction piston to the operator.

5. For use in a fluid pressure system, a hydraulic pressure producing device for controlling movement of a movable element, said device comprising an inlet port, a return port, a power cylinder, a pressure responsive member located in said power cylinder, means for transmitting the motion of said pressure responsive member to said movable element, means movable relative to said first named means for manually moving said movable element, valve means for controlling flow to and from said pressure responsive member, valve actuating means for controlling movement of said valve means, said valve actuating means including a manually movable plunger and a counterreaction piston associated with said plunger, said plunger and reaction piston being subject to the pressure exerted against said pressure responsive member, said pressure thereby providing a reaction force opposing movement of said plunger and reaction piston, and means associated with said reaction piston for neutralizing a predetermined portion of the initial reaction of said reaction piston.

References Cited in the file of this patent

UNITED STATES PATENTS

| | | |
|---|---|---|
| 2,197,075 | Fitzgerald | Apr. 16, 1940 |
| 2,241,374 | Alfieri | May 13, 1941 |
| 2,383,682 | Price | Aug. 28, 1945 |
| 2,644,305 | Price et al. | July 7, 1953 |
| 2,766,732 | Schultz | Oct. 16, 1956 |
| 2,797,665 | Chouings | July 2, 1957 |

FOREIGN PATENTS

| | | |
|---|---|---|
| 640,542 | Great Britain | July 19, 1950 |
| 830,004 | Germany | Jan. 31, 1952 |